Nov. 30, 1937.  A. DUBONNET  2,100,689
ELASTIC SUSPENSION SYSTEM
Filed June 21, 1935  4 Sheets-Sheet 2

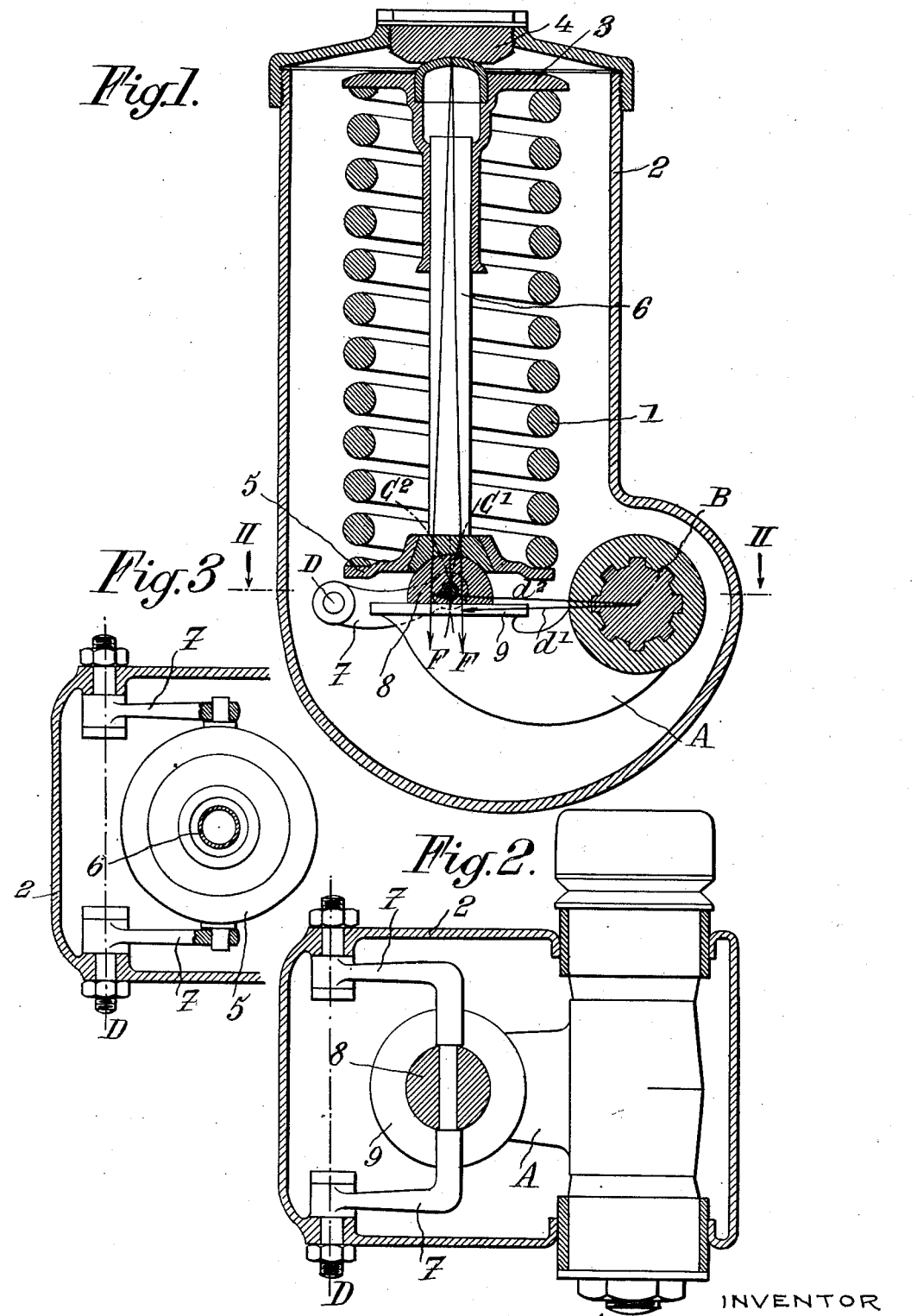

INVENTOR
André Dubonnet
BY
Bailey & Carson
ATTORNEYS

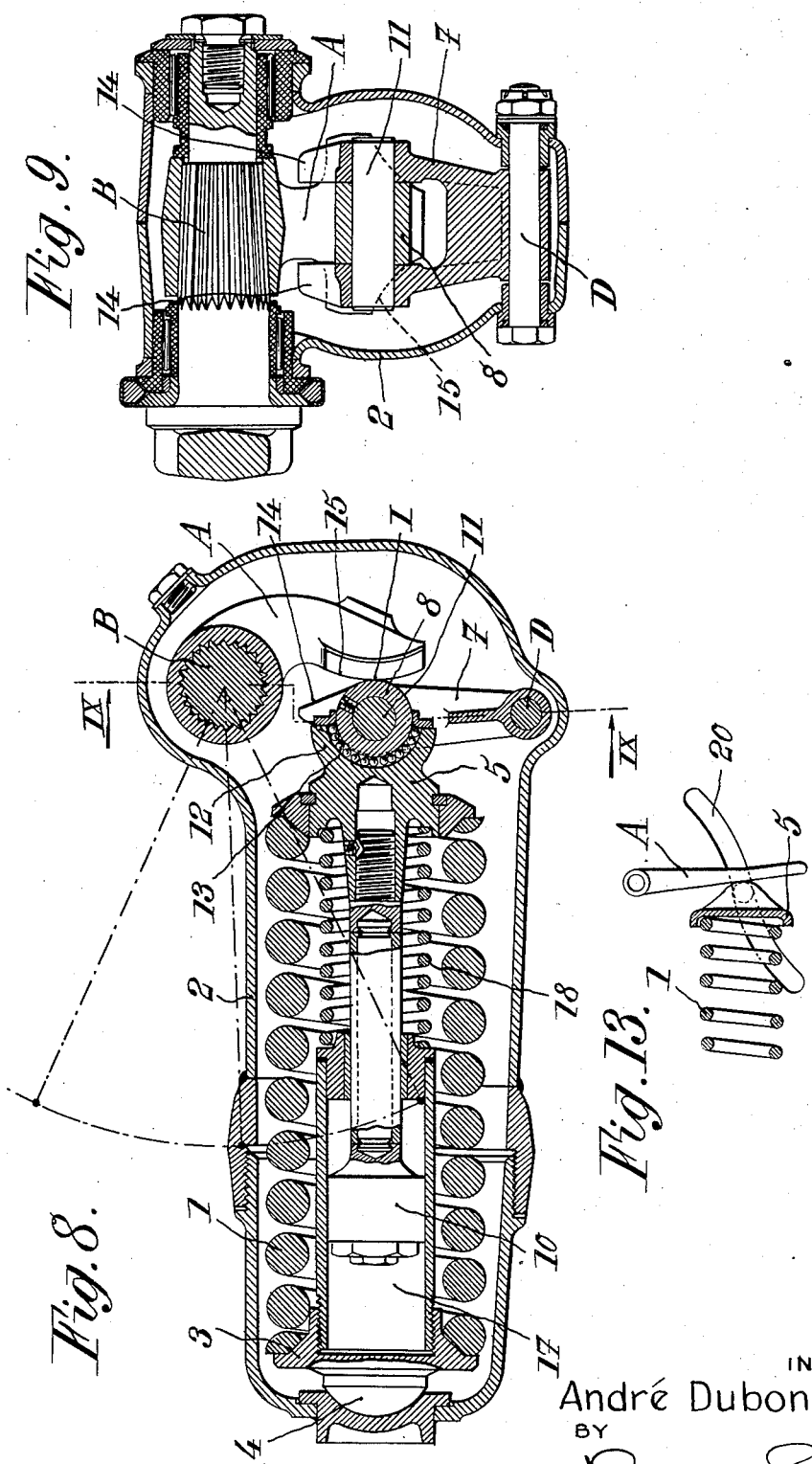

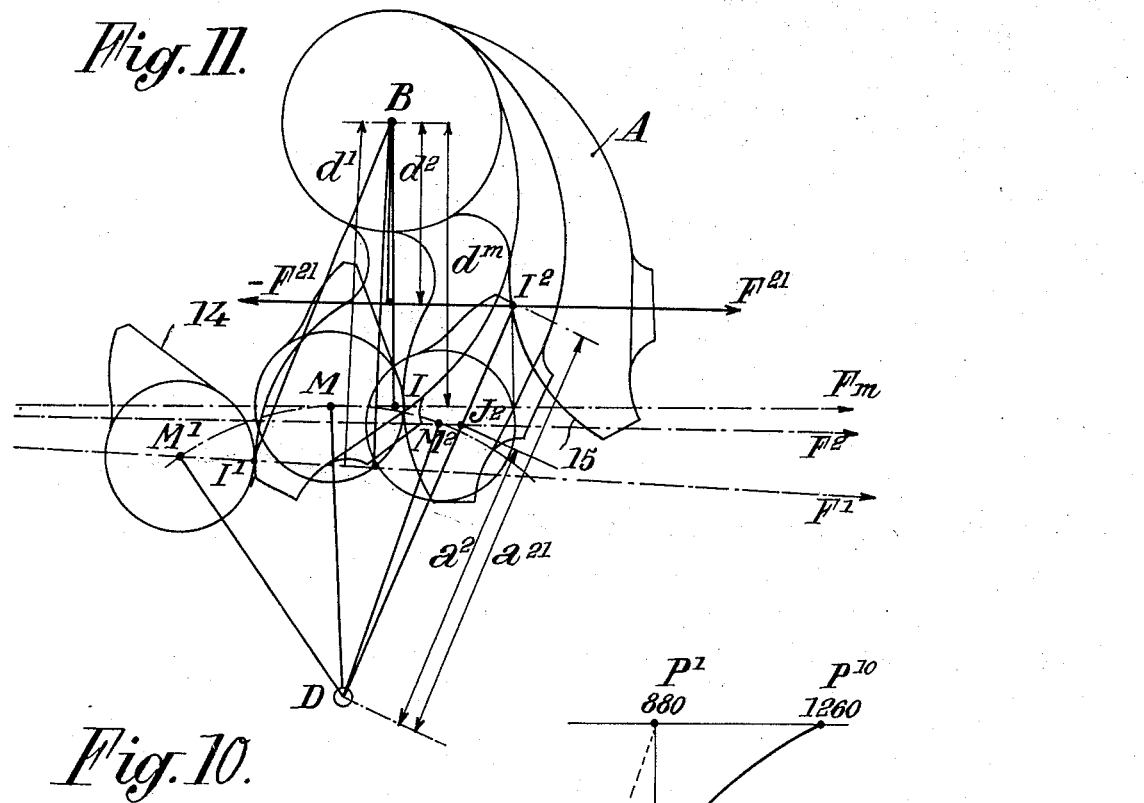
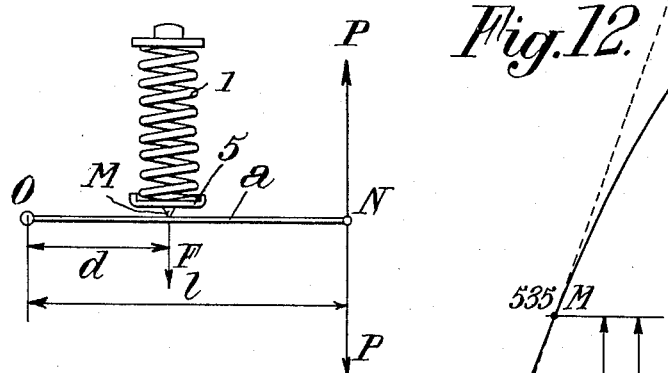
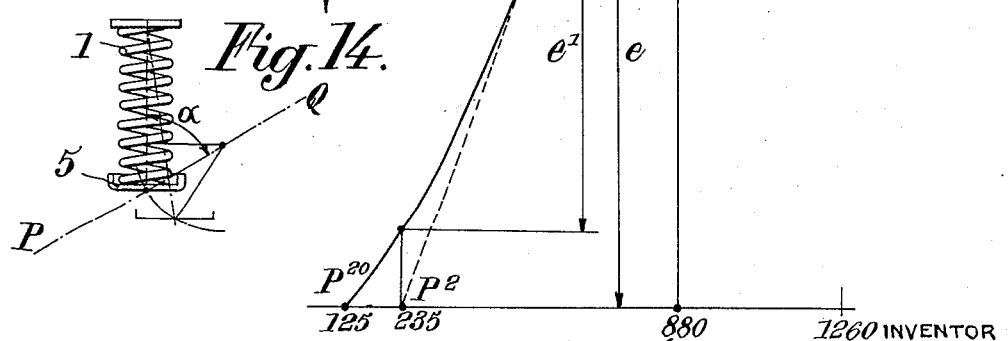

Patented Nov. 30, 1937

2,100,689

UNITED STATES PATENT OFFICE 2,100,689

ELASTIC SUSPENSION SYSTEM

André Dubonnet, Neuilly-sur-Seine, France

Application June 21, 1935, Serial No. 27,800
In Belgium June 23, 1934

10 Claims. (Cl. 267—20)

The present invention relates to elastic systems intended to balance the action of a variable load, either static or dynamic and it is especially, although not exclusively, concerned with suspension devices for vehicles, and more particularly road vehicles.

The object of the present invention is to provide a system of the kind above referred to which is better adapted to meet the requirements of actual practice than systems of the same kind devised up to the present time.

According to an essential feature of the present invention, the device includes a lever adapted to undergo the action of this variable load, a system for elastically balancing this action, and means for transmitting the action of said elastic system to said lever in such manner as to vary the flexibility of the whole in accordance with the deflection of said elastic system.

According to another feature of the present invention, said means act by varying the arm of the force exerted by said elastic system with respect to the fulcrum of said lever.

Another feature of the present invention consists in designing said means in such manner that the flexibility of the whole device decreases when the deflection of the elastic system increases.

Still another feature of the present invention consists in designing the device in such manner that, considering an intermediate position of the parts for which the deflection of the elastic system and the flexibility of the device assume well determined values (this intermediate position being, for instance, that corresponding, in the case of a suspension device for a vehicle, to the average static load), when said elastic device is moved away from said intermediate position by being caused to expand (said elastic device being in compression), the flexibility of the whole device varies in such manner that the force transmitted to the organ to be balanced by the device (for instance a wheel stub axle) decreases at a substantially higher rate than if this flexibility were supposed to remain constant when the parts are moved away from said intermediate position.

This last mentioned feature is particularly advantageous when applied to vehicles having independent wheels and especially vehicles having four independent wheels because it greatly reduces the tendency of the vehicle to turn outwardly about its longitudinal axis with respect to the wheels when running along a curve.

Other features of the present invention will result from the following detailed description of some specific embodiments thereof.

Preferred embodiments of the present invention will be hereinafter described with reference to the accompanying drawings, given merely by way of example and in which:

Fig. 1 is a longitudinal sectional view through the axis of the spring, of a suspension device for the wheel of an automobile vehicle, made according to the present invention;

Fig. 2 is a sectional view on the line II—II of Fig. 1;

Fig. 3 is a sectional view, analogous to Fig. 2, corresponding to a modification;

Figure 6:
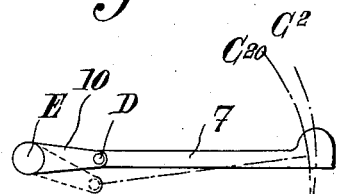
Figure 7:
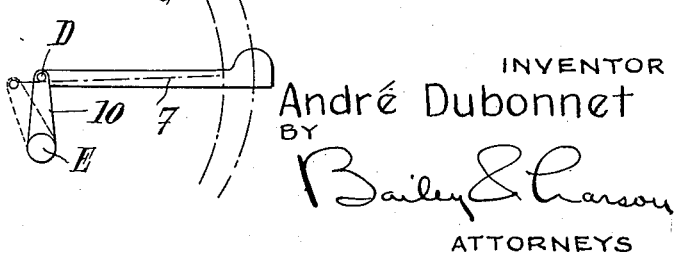

Figs. 6 and 7 diagrammatically show, according to two different modifications, some of the organs of a device made according to still another embodiment of the invention;

Fig. 8 is a longitudinal sectional view, through the axis of the spring, of a suspension device for an automobile vehicle wheel made according to still another embodiment of the invention in which the flexibility of the device increases when the spring expands;

Fig. 9 is a cross sectional view on the line 9—9 of Fig. 8;

Fig. 10 is a diagram illustrating the operation of a device according to the invention;

Fig. 11 shows, on an enlarged scale, several of the organs of the device shown by Figs. 8 and 9, these organs being shown in several characteristic working positions;

Fig. 12 is a diagram illustrating the curve of variation of the flexibility of a device according to the invention;

Figs. 13 and 14 are diagrammatical views showing the chief parts of a device of the same kind made according to two other embodiments of the present invention, respectively.

According to a first feature of the invention, an elastic device of the kind above referred to, for instance an elastic suspension device for an automobile vehicle, is devised in such manner that its elastic system (which may be of any suitable type, consisting for instance of leaf springs, coil springs, torsion tubes, etc.) balances the static or dynamic load applied to each of the wheels through the medium of at least two kinematic organs bearing upon each other, one of these members being subjected to the action of the elastic system, while the other one, which, in any case, consists of a lever, is subjected, either directly or indirectly, to the action of said load; furthermore, the whole of these elements is designed in such manner that, owing for instance to variations of the leverage of the elastic force with respect to the fulcrum of the lever upon which the load acts, the flexibility can decrease when the deflection, or compression, of the elastic system increases.

This arrangement may be carried out in many specific manners, for instance according to one of the following embodiments, which are supposed to be applied to suspensions of the kind in which the wheel is carried by an arm pivoted about an axis B, said arm driving together with it a lever A which, according to the present invention, constitutes the second of the kinematic organs above referred to.

In known suspension devices of this kind, the elastic system, which consists for instance of spring 1, acts with a force F at a fixed, or little variable, point of lever A. As this point moves along a circle $C^1$ the center of which is located on axis B (and which therefore has its concavity turned toward said axis), it is clear that, as the spring is more and more deflected, or compressed, from a mean position, the leverage $d^1$ of force F tends to decrease. Therefore, the flexibility of the whole device would rather tend to increase.

An especially advantageous embodiment of the invention consists in providing means for causing the point of application of force F on the lever to move along a curve $C^2$, which is no longer concave, but convex with respect to axis B.

In order to obtain this result, it suffices to provide an auxiliary lever 7, upon which spring 1 bears, said auxiliary lever having its fulcrum D located on the other side of said force with respect to axis B and bearing against lever A. It results clearly from Fig. 1 that the leverage $d^2$ of said force with respect to axis B then tends to increase when the spring is compressed. Fig. 1 shows the difference between $d^1$ and $d^2$ for the same deflection of the spring, these values $d^1$ and $d^2$ corresponding to an ordinary suspension device and to a suspension device according to the invention, respectively.

Concerning now the connection to be provided between spring 1 and auxiliary lever 7, I may, for instance, as shown in Fig. 3, cause the spring to bear, at the end thereof that cooperates with said lever, upon a plate 5 jointed to lever 7, which may be a double lever, as shown by the drawings.

According to another embodiment, said plate is jointed to said lever 7 not directly but through an auxiliary member 8 which will be hereinafter described, as shown by Fig. 2.

Said spring, at the end thereof opposite to that in contact with plate 5, may bear upon another plate 3 resting through an articulation or other equivalent means 3' upon the frame or upon a pivoting casing 2 which carries the whole in the case of a wheel serving to the steering of the vehicle. These two plates may be interconnected by a guiding rod 6.

Concerning now the connection to be provided between lever 7 and member 8, it may be made as follows:

According to a first embodiment, shown by Figs. 1 and 2, lever A is provided with a surface 9 upon which can slide or roll an intermediate member 8 driven together with plate 5. Said member 8 may, for instance, consist of a semispherical element maintained in centered position with respect to plate 5 and capable of sliding on said surface 9. Alternately, said member might consist of at least one roller driven by said plate.

Figure 5:
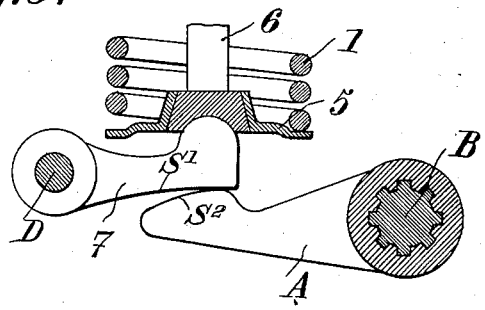
Fig. 5 is a partial sectional view of a suspension device made according to another embodiment of the invention.

According to another embodiment, illustrated by Fig. 5, levers 7 and A roll upon each other along their respective surfaces $S^1$, $S^2$ the shape of which is so designed that the point of contact tends to move away from axis B as the spring is being more and more deflected or compressed.

Of course the device may further include shock absorbing means of any suitable type disposed either on the inside or the outside of casing 2.

The device above described has a flexibility which decreases substantially when the springs are being compressed or deflected, whereby the tendency of the vehicle to overturn toward the outside when negotiating a curve is greatly reduced.

Figure 4:
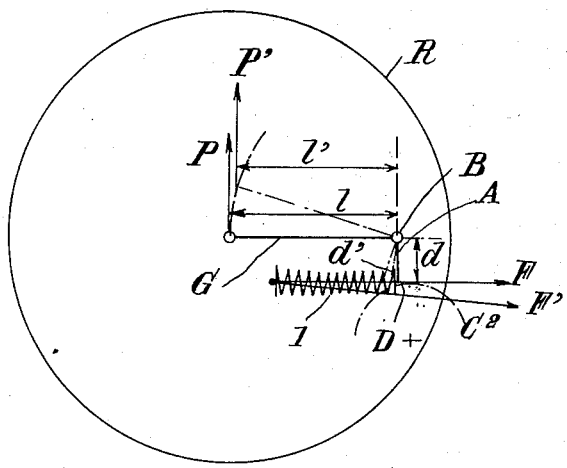
Fig. 4 is a diagram illustrating the operation of a suspension device according to the present invention.

In Fig. 4 it has been assumed that wheel R is mounted on an arm G pivoting together with lever A about axis B, and the device has been shown in two different positions, respectively in solid lines and in dotted lines. If, respectively for these two positions, the elastic force and the load are represented by P, P' and F, F', and the lever arms with reference to axis B by $l$, $l'$ and $d$, $d'$, it will be readily understood that, when passing from the position in which the spring is less deflected to the position in which it is more deflected, the flexibility of the device decreases for two reasons, to wit:

(a) not only $d$ increases, since $d'$ is greater than $d$; but also, (b) $l$ decreases, since $l'$ is smaller than $l$.

Finally, a very important decrease of the flexibility can be obtained. In the case of the embodiment of Fig. 5, the decrease of flexibility may be still greater since, at the same time as the point of contact between the two levers is moved, a force greater than F is caused to act on lever A since account must be taken of the fact that said force is transported to said point of contact, on lever 7, with a smaller leverage with reference to axis D.

Of course the invention applies to the case in which means are provided for modifying at will the law of variation of flexibility, said means being for instance such that they permit of displacing or transforming curve $C^2$.

This result may be obtained by making fulcrum D displaceable at will.

If for instance, as shown by Fig. 6, said fulcrum D is carried by a third lever 10 rotating about an axis E and substantially horizontal in its mean position it is possible, by displacing said lever from said position, to obtain another curve $C^{20}$ which intersects the original curve $C^2$. With this arrangement it is for instance possible to obtain a greater decrease of the flexibility.

If, on the contrary, this lever 10 is substantially vertical, as shown by Fig. 7, it is possible, by displacing it within certain limits, to obtain curves such as $C^{21}$ which are practically similar to curve $C^2$ but correspond to a translatory displacement of said last mentioned curve. In this case the flexibility will be reduced for all positions of the wheel but the law of variation of the flexibility will not be substantially modified.

Of course the invention is not in any way limited to these specific arrangements.

Adverting now to another group of embodiments of the invention, it will be assumed, by way of example, as diagrammatically shown in Fig. 10, that the connection between the elastic force F developed by spring 1 and the load P that balances it is ensured through a single lever $a$, pivoted about a point O. In this case, in order to obtain the desired variations of the leverage of the elastic force, it will suffice, instead of applying force F at a fixed point M of lever $a$, to move this point M along said lever in accordance with a predetermined law as a function of the position of said lever, that is to say of the deflection of the spring. Under these conditions, instead of load P, balancing the action of the spring and applied at a fixed point of the lever, remaining substantially proportional to force F, that is to say to the deflection of the spring as it would be the case if lever arm $d$ remained constant, the ratio $$\frac{P}{F}$$

varies in the same manner as the ratio $$\frac{d}{l}$$

of the lever arm $d$ and of the length $l$ of the lever.

If, on the other hand, the value of the flexibility of the whole, for a given mean position (that is to say the value of the ratio of the instantaneous corresponding variations of the deflection and of the load P for said position) is considered, it is obvious that, according as the lever arm $d$ becomes, for the other positions, smaller or greater than the value $d_m$ corresponding to said intermediate position, load P (or, what is tantamount, the force $-P$ transmitted to point N by force F) will assume values smaller or greater than those that it would assume if the flexibility remained uniform.

Therefore, concerning the law of variation to be applied and more especially when the device is to be used with a vehicle suspension, said device must be devised in such manner that, being given an intermediate position, which is for instance that corresponding to the application of the means static load to the vehicle, if the parts are moved away from this position in such manner as to reduce the deflection (compression) of the spring or springs (which are assumed to be in compression), the force $(-P)$ transmitted to the stub axle of the wheel decreases at a substantially higher rate than if the flexibility of the whole device had kept its initial value.

Such an arrangement, which can eventually be employed separately, that is to say irrespective of the law of variation of the flexibility when the deflection (compression) of the elastic system is greater than the mean compression above mentioned, is particularly advantageous in the case of vehicles having four independent wheels. This is due especially to the fact that this arrangement opposes the tendency of the vehicle to overturn about its longitudinal axis, toward the outside, when the vehicle is negotiating a curve. As a matter of fact, in this case, on the inner side of the curve, that is to say on the side on which the vehicle has a tendency to be lifted, the upward movement is, so to speak, braked by the fact that force $(-P)$, which would produce this upward movement, decreases very quickly. This rapid decrease of the elastic force transmitted by the spring or springs therefore permits of compensating for the lightening of the load P produced on the inner wheels (which run on the inner side of the curve) by the action of the centrifugal force.

The curve showing, as a function of the deflection, the variation of the load P (which, in the following description, will be considered as the same thing as the reaction of the ground exerted on the wheel by the load of the vehicle) which balances the elastic force F shall preferably be such as shown in Fig. 12. This curve must of course be tangent to the straight line $p^1$, $p^2$ representing the flexibility, at M for the mean load. Furthermore this curve should progressively deviate from this curve, with variations of curvature which are either continuous or discontinuous.

If, for instance, for the mean position, the elastic force is balanced by a load P equal to 535 kgs. and if the flexibility is 28% (represented by line $p^1$, $p^2$), it is clear that, for the same expansion of the spring, a system of the uniform flexibility type would be balanced by a load $P^2$ equal to 235 kgs., while, if the flexibility varies in accordance with the law illustrated by the curve $MP^{20}$, said load, for the same expansion, will be only $P^{20}$ equal to 125 kgs. It follows that, if in a turn the stub axle is relieved up to 235 kgs., the deflection in the second case will reach only a value $e^1$ lower than the value $e$ that it would reach if the flexibility were uniform.

Preferably, the arrangement just above described shall be employed in combination with the arrangement, described with reference to Figs. 1 to 7, in which, when the deflection of the elastic system increases from their mean position, the flexibility tends to decrease, that is to say, for the same deflection, a greater balancing load is necessary than if the flexibility remained uniform.

The tendency of the vehicle to overturn as above explained is then obviated in two ways simultaneously, to wit first as above explained concerning the suspensions of the wheels located on the inner side with respect to the curve, and, secondly, because of the gradual decrease of the flexibility with respect to the suspensions of the outer wheels.

In this case, the curve of flexibility has a shape corresponding to $P^{20}MP^{10}$, as shown by Fig. 12; it consists of two curved elements the curvatures of which are turned in opposite directions, with a point of inflection at M. In the upper portion $MP^{10}$ of the curve, the flexibility tends to decrease as the deflection increases, while in the lower portion $MP^{20}$ the flexibility tends to decrease as the deflection decreases, which means that for the same variations of the deflection, in the decreasing direction, there correspond greater and greater decreases of the force $(-P)$ transmitted to the stub axle. Similar curves would be obtained by plotting in ordinates the forces F instead of the deflections since, in the springs that are usually employed, the forces F are proportional to the deflections.

It will be easy, for someone skilled in the art, to devise kinematic arrangements permitting to vary the ratio $$\frac{P}{F}$$

as above explained.

Supposing, for instance, that a single lever is to be employed, as shown by Fig. 10, the point of application M might be displaced by suitably guiding a plate 5 against which bears one of the ends of spring 1. For instance I might guide said plate laterally by means of lugs integral with said plate and moving in slideways 20 of a shape corresponding to the law of variation to be obtained (Fig. 13).

However, I believe it more advantageous to make use of a combination including at least two levers bearing against each other at points which vary in accordance with the relative positions of these levers, as shown for instance in Figs. 8 and 9.

In this embodiment, the suspension device is of the type in which the stub axle is carried by an arm (not shown) pivoted at one end about spindle B, said spindle being itself mounted either on the frame or on a system rigid with the frame, or, in the case of wheels that serve to the steering of the vehicle, on a casing 2 which advantageously contains elastic means such for instance as a coil spring 1 and eventually shock absorbing means, said casing being pivotally mounted about a substantially vertical axis.

A plate such as 5 is arranged to bear upon a first lever 7 pivoted about an axis D while the second plate 3 against which the spring bears is mounted in a pivoting manner inside the casing, for instance through a ball and socket joint 4. Of course, this arrangement is described merely by way of example and lever 7 might be replaced by any kinematic system permitting of obtaining for plate 5 a displacement which is not circular.

This lever 7 cooperates with a second lever A the movement of which is interconnected with that of the stub axle carrying arm, said lever A being, for instance, keyed on spindle B. Of course this lever A might be replaced by any suitable kinematic system.

The surfaces along which said levers contact each other are designed in such manner that the laws above stated may be complied with.

For this purpose, in order to obtain first a law of variation corresponding to curve $MP^{10}$ (Fig. 12) for deflections greater than the mean deflection, it will suffice, as above explained with reference to Figs. 1 to 7, to cause the point of contact I of the two levers to move substantially along a portion of a circle the center of which is located on axis D. Under these conditions, as it is visible in Fig. 11, the leverage $d$ of force F exerted by spring 1 increases from the intermediate or mean position in accordance with a substantially sinusoidal law, the variations being first very small, which is quite in keeping with the obtainment of a curve $MP^{10}$ tangent to $MP^1$ at point M, as shown in Fig. 12. In Fig. 11 I have shown, at $M^1$, $F^1$, and $d^1$, the extreme position of the plate (point of contact $I^1$ on lever A), the force exerted by the spring, and the lever arm with respect to spindle B, respectively.

If $l$ is the length of the arm that carries the wheel and if the variation of the lever arm of load P is neglected, in order to simplify calculation, in position M:

$$P.l = P_m.d_m$$

and in position $M_1$:

$$P^{10}.l = F^1.d^1$$

with $d^1$ greater than $d_m$.

Advantageously, in order to reduce to a minimum friction between the two levers, for this portion of the relative displacement for which the forces that are brought into play are relatively important, force F is transmitted to lever A not directly through lever 7, but through at least one roller 8, mounted for instance on a spindle 11 carried by lever 7 which is in the form of a fork with two branches, plate 5 bearing, on the other hand, on said roller through a cylindrical surface 12 with, preferably, the interposition of needle bearings.

Now in order to obtain the law of variation of $$\frac{P}{F}$$

for deflections smaller than the mean deflection above referred to, lever 7 is, for instance, provided, on the side thereof located closer to spindle B, with an extension or nose 14, which may be made in two parts if lever 7 is fork-shaped as above explained. This nose 14 is adapted to cooperate with a portion 15 of suitable shape of lever A along which roller 8 can move, although it is also possible to provide for the latter a special runway.

It will be readily understood that anyone skilled in the art can easily calculate the shapes of the contacting surfaces of elements 14 and 15 with a view to obtaining the desired results.

It will be noted that, with the arrangement shown by the drawings, force F is not transmitted directly to lever A, but with a certain leverage ratio. As, on the other hand, the leverage $d$ with respect to spindle B is further caused to decrease, the decrease of ratio $$\frac{P}{F}$$

is therefore due to the combination of these two causes, as visible in Fig. 11, in which an extreme position $M^2$ has been illustrated.

For this position, the point of contact $I^2$ of nose 14 with surface 15 is at a distance $a^{21}$ from fulcrum D greater than the distance $a^2$ between this fulcrum and the point of contact $J^2$ of the force $F^2$ exerted by the spring in this position and line DI.

Force $F^2$, transported at point $I^2$, becomes force $F^{21}$ corresponding to the equation:

$$\frac{F^{21}}{F^2} = \frac{a^2}{a^{21}}$$

As this force $F^{21}$ acts on lever A with a leverage $d^2$ with respect to spindle B, there exists, accordingly, between $F^2$ and the value $P^{20}$ of the corresponding load, the following relation:

$$P^{20}.l = F^{21}.d^2 = F^2.\frac{a^2}{a^{21}}.d^2$$

in which $d^2$ is smaller than $d_m$ and $a^2$ is smaller than $a^{21}$.

Instead of employing several levers for transmitting force F, I might also, as shown in Fig. 14, articulate plate 5 to the single lever A, but in this case it would be necessary to choose a suitable value of the angle $\alpha$ made, for the mean or intermediate position PQ of lever A, by the direction of this lever with the direction of the axis of the spring. If this angle $\alpha$ is sufficiently acute, ranging for instance between 45° and 60°, the decrease of the leverage $d$ of force F with reference to spindle B is sufficiently rapid, when the spring expands, which gives the desired result (Fig. 11).

Of course, the device might include means for varying at will, eventually while the vehicle is running, the laws of variation of the flexibility.

For instance, for this purpose, I might mount spindle D in an adjustable manner, for instance by having it supported by an adjustable auxiliary lever. Or, if lever A (or even lever 7) is replaced by a suitable kinematic system, said system might be made adjustable at will. Or again surface 15 might be carried by an element displaceable at will.

As for the shock absorbing means that may be combined with the suspension device they may be made in any suitable manner. For instance they may consist of a piston 10 movable in a cylinder 17, said piston and said cylinder constituting advantageously guiding means for the spring, as shown in Fig. 8. Other springs may be utilized, for instance a small spring 18 interposed between plate 5 and the cylinder end 17.

As above explained, a device as above described prevents the vehicle from overturning about its longitudinal axis when negotiating a curve. Furthermore, a vehicle provided with this device holds the road much better than an ordinary vehicle. For instance when a wheel passes in a hole, the force (—P) transmitted to the axle decreases very quickly so that a shock in the downward movement is avoided and the return takes place less violently.

Of course, the device according to the present invention is applicable to the case in which the springs of the elastic system are in tension.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device of the type described for supporting a variable load which comprises, in combination, a lever arranged to support the action of said load, a spring for balancing the action of said load, a second lever pivoted about an axis located on the other side of said spring with respect to said first mentioned lever a system for transmitting through said second mentioned lever the action of said spring to said first mentioned lever, said levers occupying a predetermined intermediate position and said spring undergoing a certain intermediate deflection when the load has an intermediate value, said system including a plate forming an abutment for one end of said spring, a member rotatable with respect to said plate and pivoted about an axis fixed in position on said second mentioned lever adapted to move along the surface of said first mentioned lever, whereby the leverage of the force transmitted by said spring to said first mentioned lever, with reference to the fulcrum of said first mentioned lever is caused to increase when the deflection of said spring rises above said intermediate value, and cooperating contact surfaces on said two levers respectively adapted to come into contact when the deflection of said spring drops below said intermediate value, said surfaces being so shaped as to cause the flexibility of the device to increase when the deflection of said spring is decreasing below said intermediate value.

2. A device of the type described for supporting a variable load which comprises, in combination, a lever arranged to support the action of said load, elastic means for balancing the action of said load, and at least one member interposed between said elastic means and said lever, said member being movable in response to variations of the deflection of said elastic means so as to vary the position of the point of contact of said member with said lever along said lever, said point of contact and said elastic means being so arranged one with respect to the other that the line of force of said elastic means passes in all positions of said point of contact substantially through said latter point.

3. A device of the type described for supporting a variable load which comprises, in combination, a lever arranged to support the action of said load, elastic means for balancing the action of said load, at least one member interposed between said elastic means and said lever, said member being movable in response to variations of the deflection of said elastic means so as to vary the position of the point of contact of said member with said lever along said lever and means for mounting said elastic means so as to permit an adjusting movement thereof in such a manner that the line of force of said elastic means passes in all positions of said point of contact through said latter point.

4. A device of the type described for supporting a variable load which comprises, in combination, a lever arranged to support the action of said load, a spring for balancing the action of said load, a second lever pivoted about an axis located on the other side of said spring with reference to the fulcrum of the first mentioned lever, operatively connected with one end of said spring, said second mentioned lever contacting with a point of said first mentioned lever movable thereon, the connecting point between said spring and said second mentioned lever on the one hand and the contacting point between said two levers on the other hand lying in all positions substantially on the line of force of said spring.

5. A device according to claim 4 further including means for mounting said spring so as to permit an adjustment thereof, and a plate forming an abutment for one end of said spring and pivoted to said second mentioned lever.

6. A device according to claim 4 further including a casing for said spring, a plate forming an abutment for one end of said spring and pivoted to said casing, a second plate forming an abutment for the other end of said spring and pivoted to said second mentioned lever.

7. A device of the type described for supporting a variable load which comprises, in combination, a lever arranged to support the action of said load, elastic means for balancing the action of said load, at least one member interposed between said elastic means and said lever, said member being movable in response to variations of the deflection of said elastic means so as to vary the position of the point of contact of said member with said lever along a predetermined path and means for modifying the path according to which the position of said point of contact is varied.

8. A device of the type described for supporting a variable load which comprises, in combination, a lever arranged to support the action of said load, a spring for balancing the action of said load, a second lever pivoted about an axis located on the other side of said spring with reference to the fulcrum of the first mentioned lever, operatively connected with one point of said spring, said second mentioned lever being adapted to transmit the action exerted on a fixed point thereof by said spring to a point of said first mentioned lever movable thereon and means for displacing the axis of said second lever.

9. A device of the type described for supporting a variable load which comprises, in combination, a lever arranged to support the action of said load, elastic means for balancing the action of said load, said lever occupying a predetermined position and said spring undergoing a certain deflection when the load has a predetermined intermediate value, and at least one member interposed between said elastic means and said lever, said member being movable in response to variations of the deflection of said elastic means so as to vary the position of the point of contact of said member with said lever along said lever in such a manner that the flexibility decreases by progressively greater amounts when the deflection of said elastic means rises above and drops below said intermediate value.

10. A suspension device for vehicles comprising, in combination, a shaft, a wheel supporting lever fixed on said shaft, a second lever fixed on said shaft, elastic means for supporting the weight of the vehicle, and at least one member interposed between said elastic means and said second lever, said member being movable in response to variations of the deflection of said elastic means so as to vary the position of the point of contact with said lever along said lever, said point of contact and said elastic means being so arranged one with respect to the other that the line of force of said elastic means passes in all positions of said point of contact substantially through said latter point.

ANDRÉ DUBONNET.